United States Patent
Bandera et al.

(10) Patent No.: US 9,785,688 B2
(45) Date of Patent: *Oct. 10, 2017

(54) AUTOMATED ANALYSIS AND VISUALIZATION OF COMPLEX DATA

(71) Applicant: International Business Machines Corporation, Armonk, NY (US)

(72) Inventors: Deborah H. Bandera, Austin, TX (US); Denise A. Bell, Austin, TX (US); Alex D. Little, Raleigh, NC (US); Billy B. York, Pflugerville, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 612 days.

This patent is subject to a terminal disclaimer.

(21) Appl. No.: 14/283,736

(22) Filed: May 21, 2014

(65) Prior Publication Data

US 2015/0339032 A1 Nov. 26, 2015

(51) Int. Cl.
*G06F 3/0484* (2013.01)
*G06F 17/30* (2006.01)
(Continued)

(52) U.S. Cl.
CPC ...... *G06F 17/30572* (2013.01); *G06F 3/0484* (2013.01); *G06F 3/04842* (2013.01);
(Continued)

(58) Field of Classification Search
CPC ............ G06F 3/00; G06F 3/48; G06F 3/0481; G06F 3/0482; G06F 3/0484;
(Continued)

(56) References Cited

U.S. PATENT DOCUMENTS 5,696,811 A 12/1997 Maloney et al.
6,058,163 A 5/2000 Pattison et al.
(Continued)

OTHER PUBLICATIONS

CITES, CITES Help Desk Monthly Report, http://www.cities.illinois.edu/help/reports/, Mar. 4, 2012.*
(Continued)

*Primary Examiner* — Xiomar L Bautista
(74) *Attorney, Agent, or Firm* — Garg Law Firm, PLLC; Rakesh Garg; Scott S. Dobson

(57) ABSTRACT

A system, and computer program product for automated analysis and visualization of log data are provided in the illustrative embodiments. A subset of information to be visualized is selected from a set of information. Each information in the set comprises a result of a corresponding analysis technique applied to the log data. For an information in the subset of information, a tagged portion of the log data is analyzed according to the corresponding analysis technique to discern the information. The information corresponds to a tag used in conjunction with the tagged portion. For the information, a manner of visualizing the information is selected. A set of graphical visualizations comprising a corresponding graphical visualization for each information is generated, including a visualization in the selected manner of visualizing the information. The graphical visualizations in the set are combined such that a subset of graphical visualization is selectable for presentation.

11 Claims, 10 Drawing Sheets

(51) Int. Cl.
*G06T 11/20* (2006.01)
*G06Q 10/00* (2012.01)

(52) U.S. Cl.
CPC ....... *G06F 17/30011* (2013.01); *G06Q 10/00* (2013.01); *G06T 11/206* (2013.01)

(58) Field of Classification Search
CPC .................. G06F 3/04842; G06F 17/30; G06F 17/30554; G06K 9/18; G06T 11/60; G06T 11/206
See application file for complete search history.

(56) References Cited

U.S. PATENT DOCUMENTS

| 6,400,366 | B1* | 6/2002 | Davies ................. G06T 11/206 345/440 |
|---|---|---|---|
| 7,734,775 | B2* | 6/2010 | Barnett ............... G06F 11/3495 703/14 |
| 2002/0070953 | A1* | 6/2002 | Barg ..................... G06Q 10/10 715/700 |
| 2009/0019310 | A1 | 1/2009 | Nastacio et al. |
| 2011/0066559 | A1 | 3/2011 | White et al. |
| 2011/0270770 | A1 | 11/2011 | Cunningham et al. |
| 2012/0317508 | A1 | 12/2012 | Schone et al. |
| 2013/0311975 | A1 | 11/2013 | Supplisson et al. |
| 2015/0040052 | A1* | 2/2015 | Noel .................... G06F 3/04847 715/771 |
| 2015/0149837 | A1* | 5/2015 | Alonso .............. G06K 7/10227 714/57 |

OTHER PUBLICATIONS

Freescale, Software and Tools Information Center, http://www.freescale.com/infocenter/topic/com.freescale.doc.mcu.analysis.us . . . 2004-2013.*
GIV@, IT Help Desk Reports with Metrics, Business Analytics & Key Performance Indicators (KPIs), http://www.givainc.com/it-help-desk-reports-metrics-charts-graphs-kpi.htm, 2014.
HELPDESKPILOT, Reports and analytics on all help desk activities, http://www.helpdeskpilot.com/helpdesk/features/powerful-reporting.php; 2014.
Built-in Reports; http://www.mojohelpdesk.com/reports.php, Feb. 2014.
IBM—REDBOOKS, OnDemand SQL Performance Analysis Simplified on DB2 for i5/OS in V5R4, http://www.redbooks.ibm.com/redbooks/SG247326/wwhelp/wwhimpl/js/html/wwhelp.htm, 2004.
Kayako—Jamie Edwards, Visualize Helpdesk Data and Identify Support Trends with New Report Charts, http://blog.kayako.com/charts-for-reports/, Apr. 24, 2012.
MANAGEENGINE, SERVICEDESK PLUS, ServiceDesk Plus Reports provides it all, http://www.manageengine.com/products/service-desk/help-desk-reports.html, 2014 Zoho Corporation Pvt. Ltd.

* cited by examiner

AUTOMATED ANALYSIS AND VISUALIZATION OF COMPLEX DATA

TECHNICAL FIELD

The present invention relates generally to a system, and computer program product for analysis of complex documents. More particularly, the present invention relates to a system, and computer program product for automated analysis and visualization of complex data.

BACKGROUND

Certain documents as well as unstructured data can be complex. The complexity of the data arises from a variety of factors, including but not limited to the length of the document or volume of the data, the manner in which data is generated for a given document, the manner in which data is organized or presented in a given document, monotonous or repetitive data interspersed with hard to find information of interest, and cryptic or ambiguous representation of the data.

Log data, event records, transaction history, status monitoring log, trouble tickets, and bug reports are some examples of complex documents that exhibit some combination of these and other complexity factors. For example, software support teams use trouble tickets to track the problems reported by clients and the various interactions between the support engineers and the client for the duration of the problem. Diagnosing and solving complex problems that involve multiple components or products can take months, and the problem record can grow to be hundreds of pages long. The post-problem analysis process uses the problem record to understand why the problem was so difficult to diagnose, so that the root cause of the problem can be addressed.

SUMMARY

An embodiment includes a method for automated analysis and visualization of log data. The embodiment selects, from a set of information, a subset of information to be visualized, wherein each information in the set comprises a result of a corresponding analysis technique applied to the log data. The embodiment analyzes, using a processor and a memory, for an information in the subset of information, a tagged portion of the log data according to the corresponding analysis technique to discern the information, wherein the information corresponds to a tag used in conjunction with the tagged portion. The embodiment selects, for the information, a manner of visualizing the information. The embodiment generates a set of graphical visualizations comprising a corresponding graphical visualization for each information in the subset of information, including a visualization in the selected manner of visualizing the information. The embodiment combines the graphical visualizations in the set such that a subset of graphical visualization is selectable for presentation.

Another embodiment includes a computer usable program product comprising a computer readable storage device including computer usable code for automated analysis and visualization of log data. The embodiment further includes computer usable code for selecting, from a set of information, a subset of information to be visualized, wherein each information in the set comprises a result of a corresponding analysis technique applied to the log data. The embodiment further includes computer usable code for analyzing, for an information in the subset of information, a tagged portion of the log data according to the corresponding analysis technique to discern the information, wherein the information corresponds to a tag used in conjunction with the tagged portion. The embodiment further includes computer usable code for selecting, for the information, a manner of visualizing the information. The embodiment further includes computer usable code for generating a set of graphical visualizations comprising a corresponding graphical visualization for each information in the subset of information, including a visualization in the selected manner of visualizing the information. The embodiment further includes computer usable code for combining the graphical visualizations in the set such that a subset of graphical visualization is selectable for presentation.

Another embodiment includes a data processing system for automated analysis and visualization of complex data. The embodiment further includes a storage device including a storage medium, wherein the storage device stores computer usable program code. The embodiment further includes a processor, wherein the processor executes the computer usable program code. The embodiment further includes computer usable code for selecting, from a set of information, a subset of information to be visualized, wherein each information in the set comprises a result of a corresponding analysis technique applied to the log data. The embodiment further includes computer usable code for analyzing, for an information in the subset of information, a tagged portion of the log data according to the corresponding analysis technique to discern the information, wherein the information corresponds to a tag used in conjunction with the tagged portion. The embodiment further includes computer usable code for selecting, for the information, a manner of visualizing the information. The embodiment further includes computer usable code for generating a set of graphical visualizations comprising a corresponding graphical visualization for each information in the subset of information, including a visualization in the selected manner of visualizing the information. The embodiment further includes computer usable code for combining the graphical visualizations in the set such that a subset of graphical visualization is selectable for presentation.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
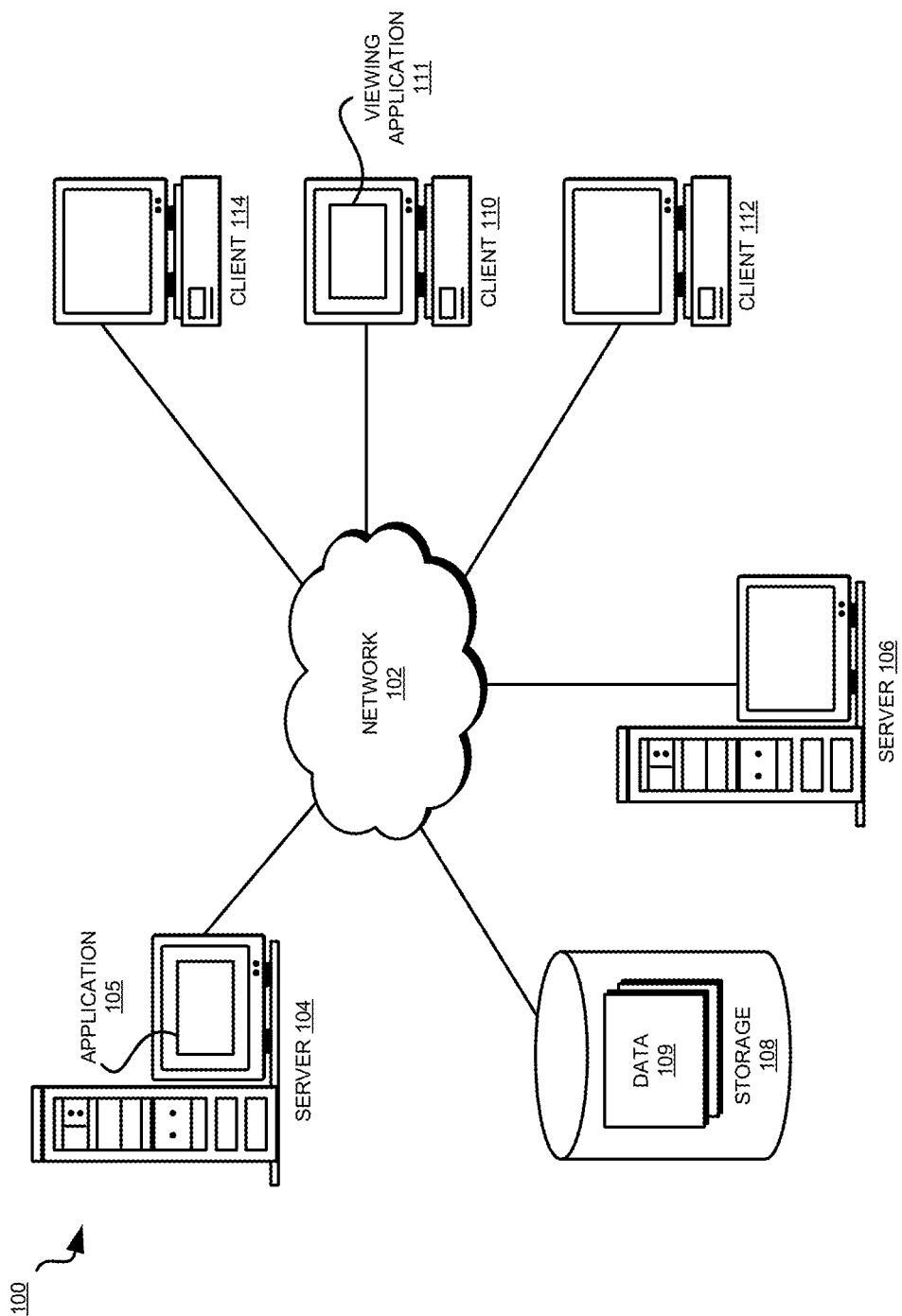
FIG. 1 depicts a block diagram of a network of data processing systems in which illustrative embodiments may be implemented.

Within the scope of the illustrative embodiments, complex documents such as data resulting from log entries, event reporting, transaction processing, status monitoring, trouble tickets, and bug reports are collectively referred to as "log data," unless specifically stated otherwise where used. A problem record as described earlier is also a type of log data. Without being limited thereto, and only for the clarity of the description, an example of a problem record will be used to describe certain illustrative embodiments. The illustrative embodiments described herein are adaptable and usable in conjunction with the other complex data or documents in a similar manner. Such adaptations and use are contemplated within the scope of the illustrative embodiments.

Presently, problem record analysis is a manual task, an effort that requires reading through the problem history and comprehending the notes therein. For example, embedded in the problem record is information of interest, such as the identities of the teams who owned the problem, their length of the ownership, their actions, their limitations, supplemental documents, or data used or supplied, and so on.

Furthermore, some information may not be explicitly available in the data, but may have to be inferred from the data. For example, while a record of the client escalating the problem may be present in the problem record, the threshold at which they felt compelled to escalate the problem, and pre-cursers to that escalation are some example pieces of information that are not explicit in the record but have to be inferred from the analysis of the record.

Analyzing one problem record can easily take many hours of dedicated human effort. Furthermore, different human analysts may interpret data differently, assign different weight to the same piece of information according to their experiences, and make individual selections to include or omit different pieces of information in their analyses. As a result, the outcome of the analysis can be inconsistent, confusing, and sometimes even erroneous.

The cost and amount of resources expended in analyzing complex documents can be prohibitive for other reasons. For example, when a significant number of documents are expected to include data in a common form or structure, custom automated solutions are created to analyze the data. However, such custom solutions are difficult to manage, adapt, or update with changing data.

Even when the complex data is somehow analyzed, presently, the outcome of the analysis is not presented in an effective manner. A summary of complex data in the same form as the complex data itself is not very helpful to someone who is not versed in the data or its structure. Therefore, an improved manner of analyzing and visualizing complex data is desirable.

The illustrative embodiments used to describe the invention generally address and solve the above-described problems and other problems related to complex data analysis. The illustrative embodiments provide a system, and computer program product for automated analysis and visualization of complex data.

Given a document with complex data, an embodiment is configured with one or more manners of identifying the information of interest in the complex data. For example, when the information is expected to appear in a certain form, the embodiment searches for the data that conforms to the specified form. As another example, when the information is expected to appear in certain places, positions, or relative positions with other information, the embodiment extracts the information occupying those places, positions, or relative positions. When one piece of information is expected to reference another piece of information or document, an embodiment is configurable to identify the referential relationship, locate the referenced data, and even analyze the referenced data.

An embodiment is further configured to visually represent the outcome of the analysis of the complex data. For example, one embodiment presents a bar-graph or another suitable graphical representation to depict a timeline between the analyzed information of interest. Different pieces of information are visually distinguished from one another with the use of colors, patterns, graphics, icons, weights, lines, objects, geometric forms, and other suitable graphical representations.

Another embodiment presents additional graphical indicators on the visualization of the information of interest. Such additional indicators are usable for indicating additional information, suggested actions, underlying details of a summarized information, a contributor of the information, other related information or data, and links or references to the underlying complex data or other related data or documents.

Another embodiment can further supply additional visualization or enhance a visualization presented from another embodiment. For example, the embodiment overlays a bar-graph or histogram visualization with trend graphs, depicting a change or rate of change in some information. As another example, the embodiment can place icons adjacent to some visualization indicating significant events, unusual activities or data, need for further analysis or attention, availability or unavailability of additional data or documents, interesting details about a visualized information, and so on.

A legend provides context to the graphical representations. For example, the legend provides detailed information to the user about the symbology, iconography, and visual representations used in the visualization. As another example, the legend is also useful to those not versed in the contents of the complex data, in determining how the visualized information is represented in the complex data, and therefore how to read the complex data.

An embodiment is usable to analyze and visualize different versions of the same document, or two or more different documents being compared. The visualization gives the viewer a quick visual overview of the extent of the differences between the compared documents, the locations of the various differences, relative sizes of the differences in the various portions, and other comparative information. The viewer is thus enabled to quickly and efficiently locate a portion of concern in a document, a type of difference to address in a document, and to perform other similar document manipulation actions with the help of an embodiment.

The illustrative embodiments are described with respect to certain documents, complex data, forms of data, structure of data, data sources, visualizations, visual objects, visual characteristics, events, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
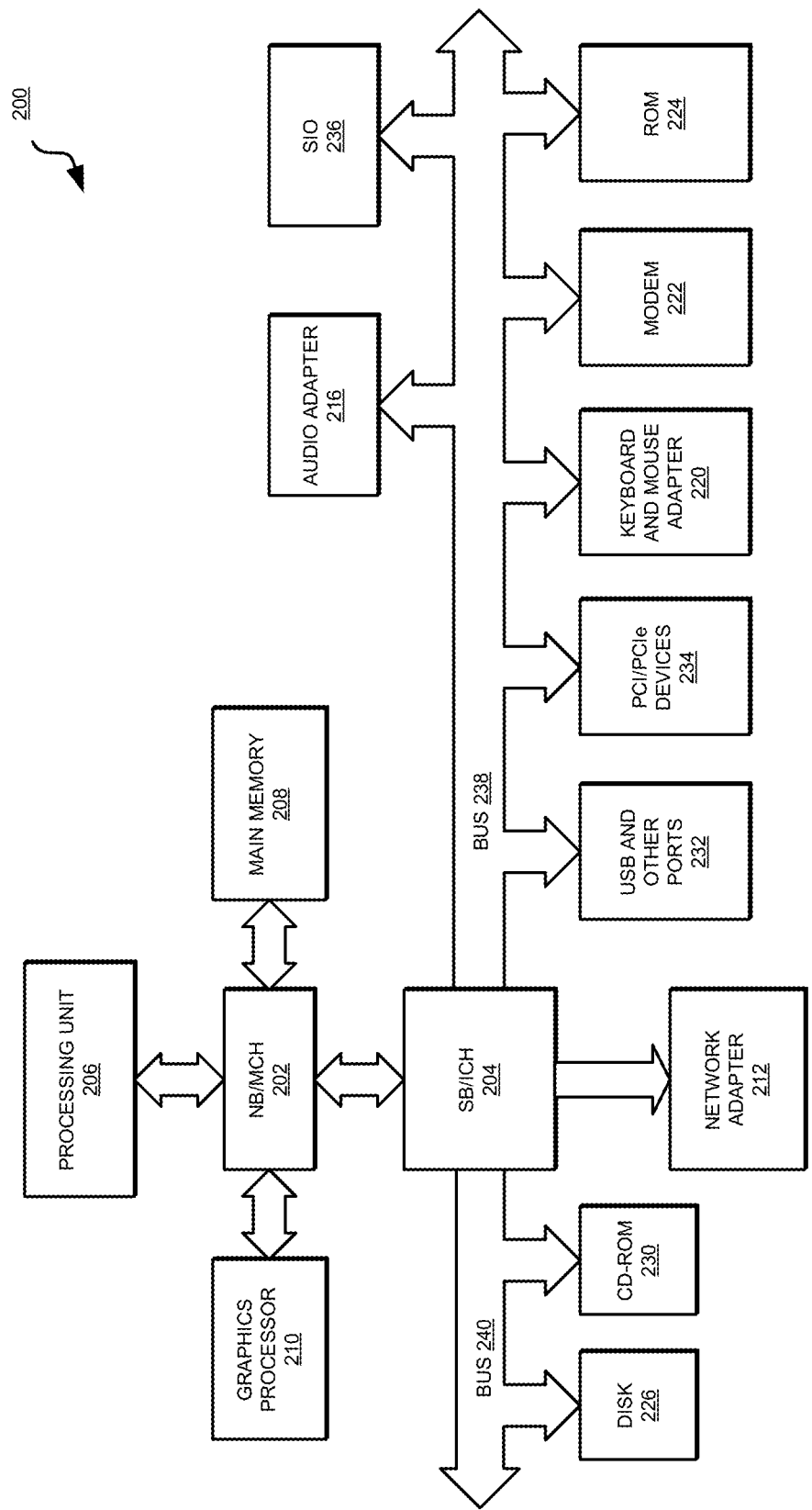
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an embodiment. For example, application 105 in server 104 implements an embodiment described herein.

Data 109 in storage 108, is complex data as described herein, for example and without implying any limitation thereto, log data or problem record data. Viewing application 111 in client 110 is any suitable application for viewing visualized information, such as a browser or another application capable of rendering and displaying information in graphical form.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114, or systems 132, 136, or 142 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and viewing application 111 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
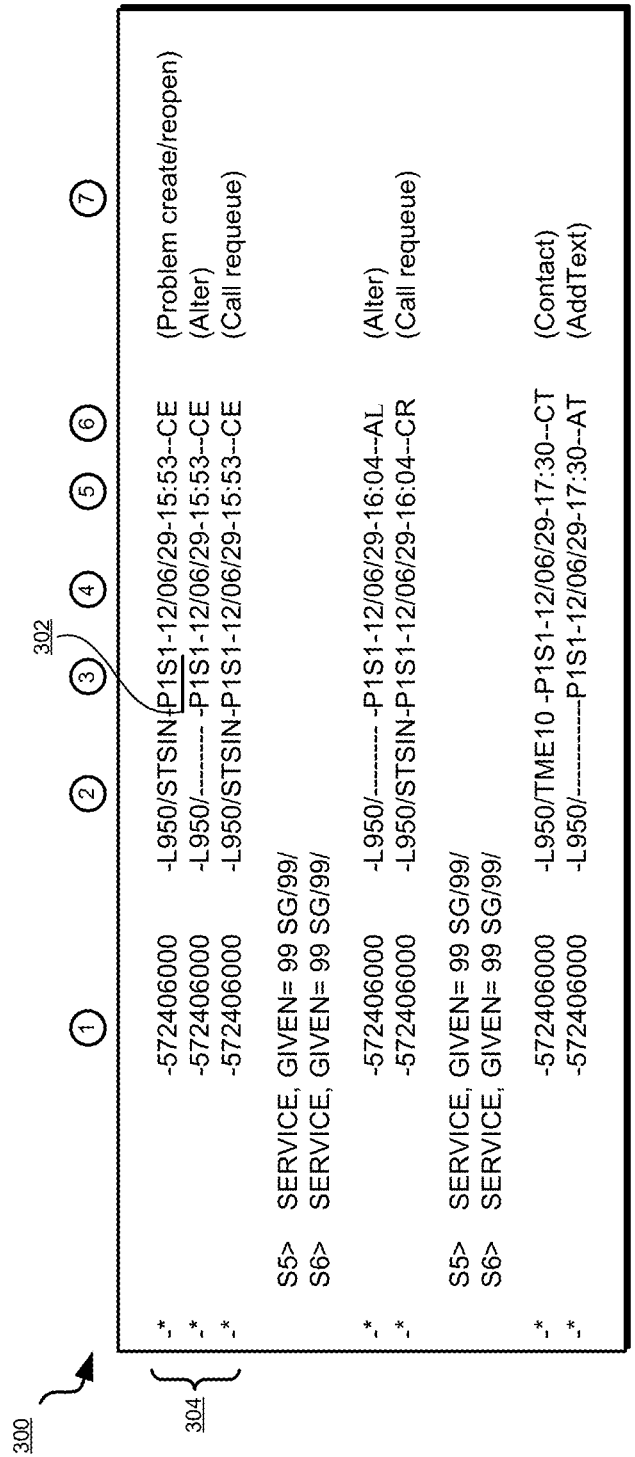
FIG. 3 depicts a sample of complex data from a problem record that can be analyzed and visualized using an illustrative embodiment.

With reference to FIG. 3, this figure depicts a sample of complex data from a problem record that can be analyzed and visualized using an illustrative embodiment. Data 300 is an example of data 109 in FIG. 1.

As can be seen, data 300 contains several pieces of information in cryptic or coded form. Without the knowledge of the codes and the structure of data 300, analyzing hundreds of pages of similar data, of which data 300 is only a small sample, is a very difficult and error-prone task, presently relegated to human analysts.

An embodiment, for example implemented as application 105 in FIG. 1, is configured to recognize the coded information, structural organization, or both, as used in data 300, to be able to analyze data 300 and present a visualization of data 300. In one embodiment, the coding used in the coded information, the structural placement in the structural organization, or both, are encapsulated as tags. The tag is then associated with the data that is to be coded or placed in the structure at the time of data-entry.

For example, code 302 is a string "P1S1" in data 300. The code stands for priority 1, severity 1. A catalog of codes is available to trained human analysts to understand this and other variants of code 302.

Furthermore, code 302 appears in the third position in entries that conform to the structure of entry 304. Thus, the application can analyze data 300 to find instances of priorities and severities of events using the structure of the codes, e.g., "P*S*", in the third position of entries like entry 304 in data 300.

Similarly, the code appearing at the sixth position in entries like entry 304 indicate the type of event that the entry represents. The codes of the various possible events are also available in a catalog, and are usable by the application in a similar manner. Extracting the various events of interest then becomes an analytical problem of locating entries that include the codes of the events of interest. The time-stamp data at fourth and fifth positions in the entries with those event codes provide additional related information about when those events occurred.

Data or documentation can be supplied or associated with an event (not shown). For example, an entry (not shown) may show that within a time-window from an event of interest, additional data, e.g., a core dump or a screen-shot, was received and logged. As an example, the application implementing an embodiment determines the proximity of the two entries—the entry of the event and the proximate entry of the receipt of the additional data—within a threshold distance in the complex data warrants an implication that the two entries are related. Once the application has completed the analysis of data 300 and the remainder of the document these and other pieces of information in a similar manner, the application presents a visualized presentation of the outcome of the analysis, as described with respect to the examples depicted in FIGS. 4-9 below.

Several entries in the given complex data may also represent a continuity of a single event or operation. For example, when a consultant is working to correct the problem complained of in a trouble ticket, the consultant may make several entries in the problem record, documenting activities such as the steps taken, problems encountered, data used, resources consumed, individuals consulted, systems connected, tools used and their outcomes, and many other activities. The application implementing another embodiment is configured to identify related entries. For example, if the code in the second position remains the same in consecutive entries, and the entries are no more than a threshold duration apart, a rule may justify treating the entries as reporting a continuing activity.

From such example analyses, or other similarly purposed analyses of the given document, the application can extract and summarize several entries of different priorities, severities, related to certain events, having associated data, or a combination thereof, that appear in the given document, which includes data 300. Note that the simplified example of code structures, locations, and proximities, are described only for the clarity of the description and not to imply any limitation on the illustrative embodiments. From this disclosure, those of ordinary skill in the art will be able to configure an embodiment for more complex analyses in other circumstances, and the same is contemplated within the scope of the illustrative embodiments.

Figure 4:
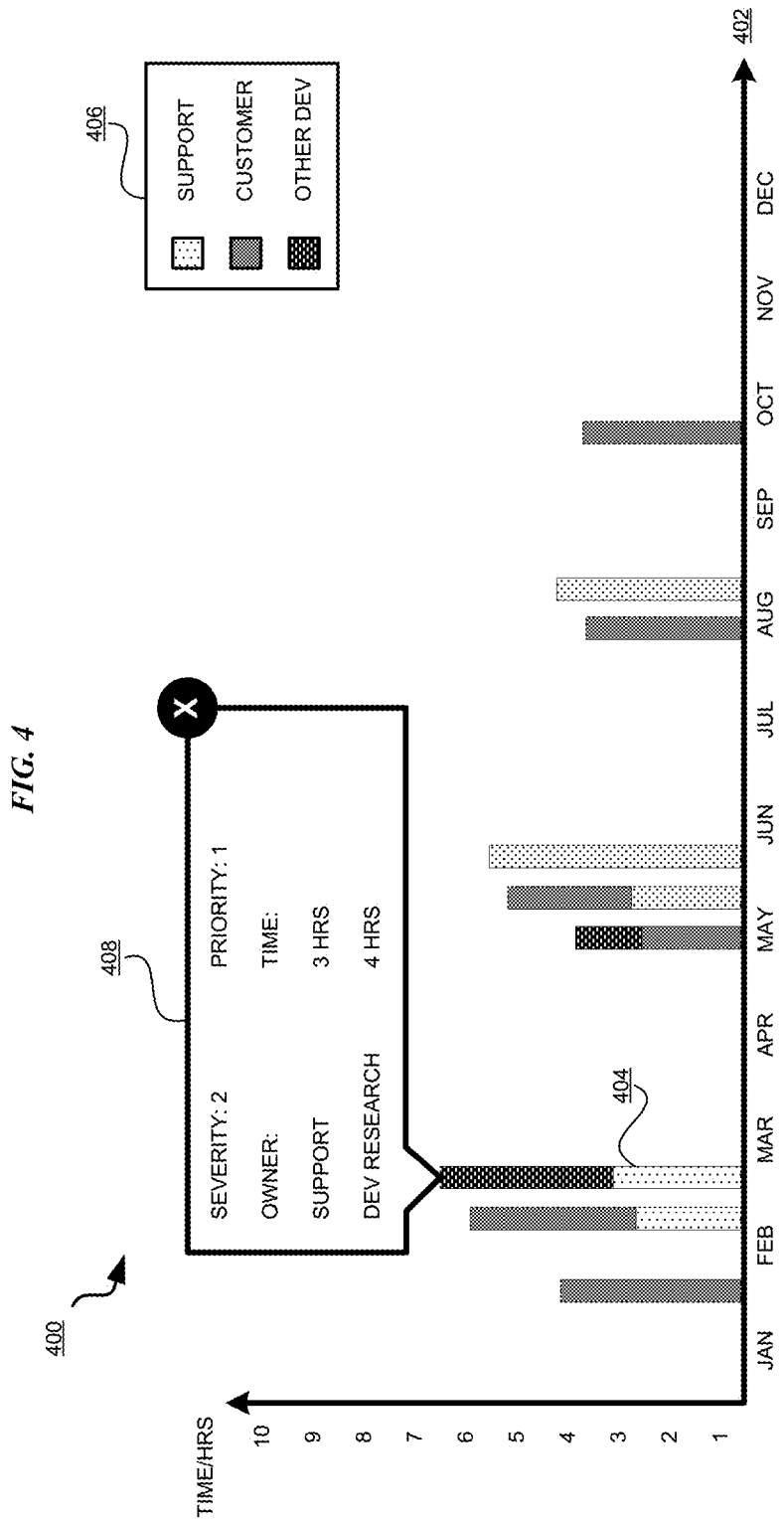
FIG. 4 depicts an example visualization of complex data in accordance with an illustrative embodiment.

With reference to FIG. 4, this figure depicts an example visualization of complex data in accordance with an illustrative embodiment. Visualization 400 can be generated from application 105 in FIG. 1, which implements an embodiment described herein. Visualization 400 can be viewed or manipulated using viewing application 111 in FIG. 1.

Visualization 400 depicts the result of an example analysis according to an embodiment described earlier. For example, over timeline 402, an embodiment implemented in application 105 of FIG. 1 presents the analysis of a lengthy problem record. Particularly, the application presents when certain events of interest occurred with respect to a problem, the status of the problem at the time of those events, teams or individuals who owned the problem resolution responsibility at the time of those events, and the amount and type of resources those problem owners expended on the problem resolution.

For example, bar 404 in the bar-graph representation of visualization 400 corresponds to an event of interest. The event occurred between February and March. The event—possibly a troubleshooting effort—lasted approximately seven hours, and was owned or handled by at least two teams (who made the entries). This much information is readily available by simply looking at bar 404, without any knowledge of the codes or entries in the problem record, which for example may include data similar to data 300 of FIG. 3.

Another embodiment implemented in the application allows additional details to be selectively visualized. For example, legend 406 allows the viewer to select and present the visualization to identify those two teams that are represented in bar 404.

Another embodiment implemented in the application allows additional details to be selectively visualized. According to this embodiment, the application associates a visualization control (not shown) with bar 404. When activated, the visualization control pops-up, reveals, or displays balloon 408. Example information in balloon 408 informs the viewer that at the time of the events represented in bar 404, the problem was at priority 1 and severity 2, and the amounts of resources each of the two teams expended.

Of course, any other pertinent information available from the complex data can similarly be presented in visualization 400, timeline 402, bar 404 or other suitable representation in visualization 400, legend 406, balloon 408, or a combination thereof. For example, even though timeline 402 is a coarse timeline—only resolving to a 1-month interval, balloon 408 can be configured to selectively appear and show the exact dates and times of the events represented in bar 404, e.g., from information available at positions 4 and 5 in the entries in data 300 in FIG. 3.

Figure 5:
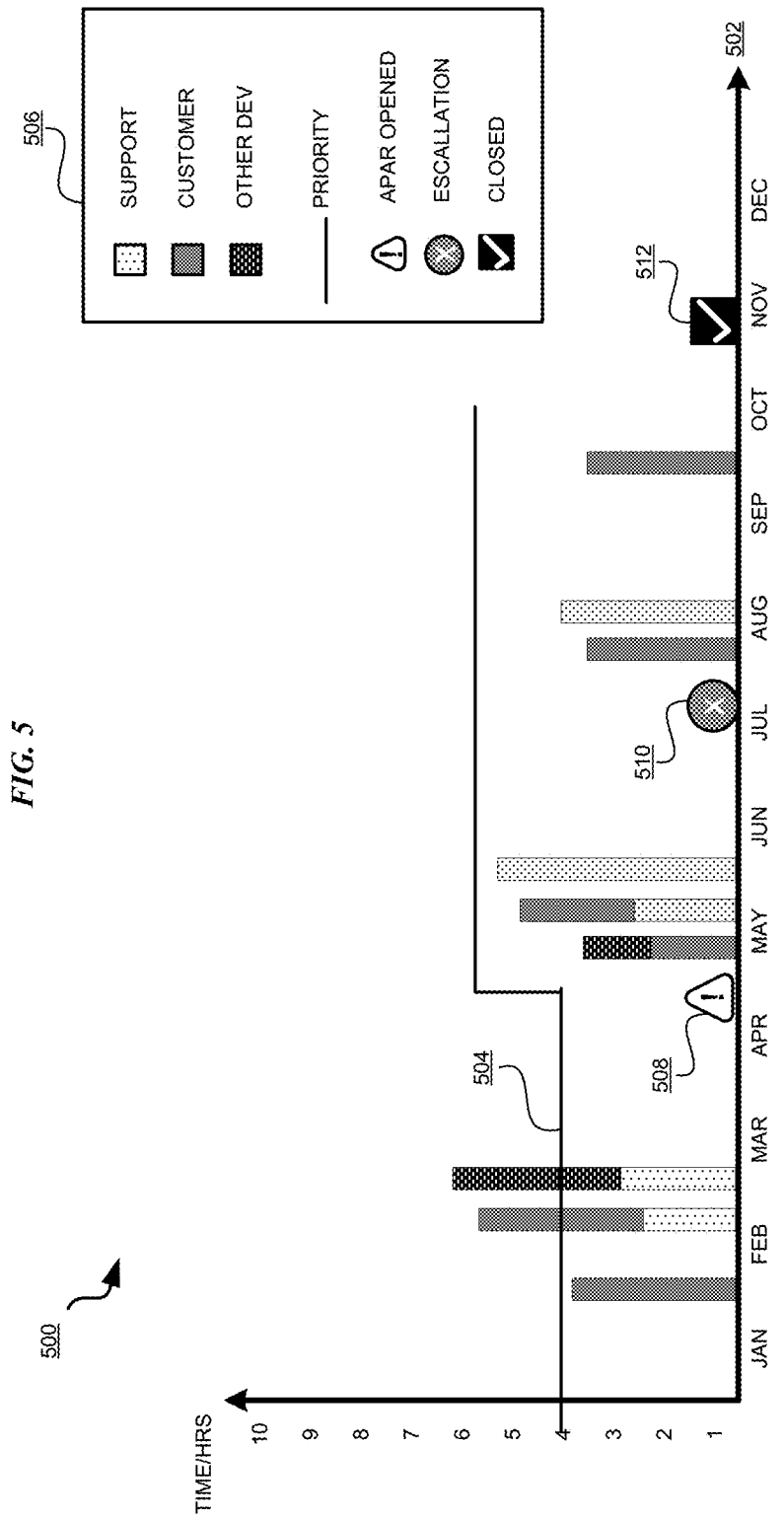
FIG. 5 depicts another example visualization of complex data in accordance with an illustrative embodiment.

With reference to FIG. 5, this figure depicts another example visualization of complex data in accordance with an illustrative embodiment. Visualization 500 can be generated, viewed, selected, selectively activated, and manipulated in a manner similar to visualization 400 in FIG. 4.

Visualization 500 depicts the result of another example analysis according to an embodiment. For example, over timeline 502, an embodiment implemented in application 105 of FIG. 1 presents the analysis of a lengthy problem record. Particularly, the application presents when certain events of interest—including significant events—occurred with respect to a problem, and priority trending of the problem during those events.

For example, bars in the bar-graph representation of visualization 500 correspond to certain events of interest. Trend-line 504 represents the priority of the problem over the course of those events during the period on timeline 502. Another embodiment implemented in the application allows additional details, such as legend 506 to be presented in the manner of legend 406 in FIG. 4.

Trend line 504 shows that the priority of the problem was increased sometime at the beginning of April, approximately when significant event 508 occurred. The problem existed with the elevated priority when another significant event 510 occurred, and the problem was resolved in November when another significant event 512 occurred while the priority remained elevated. Legend 506 informs about the nature of significant events 508, 510, and 512. This much information is readily available by simply looking at trend line 504 and significant event icons 508, 510, and 512, without any knowledge of the codes or entries in the problem record, which for example may include data similar to data 300 of FIG. 3.

Of course, any other pertinent information available from the complex data can similarly be presented in visualization 500, timeline 502, trend line 504 or other suitable representation in visualization 500, legend 506, icons 508-512, or a combination thereof. For example, even though timeline 402 is a coarse timeline—only resolving to a 1-month interval, a balloon or another suitable visualization can be configured to show the exact dates and times of significant events 508, 510, and 512 in the manner of balloon 408 in FIG. 4.

Figure 6:
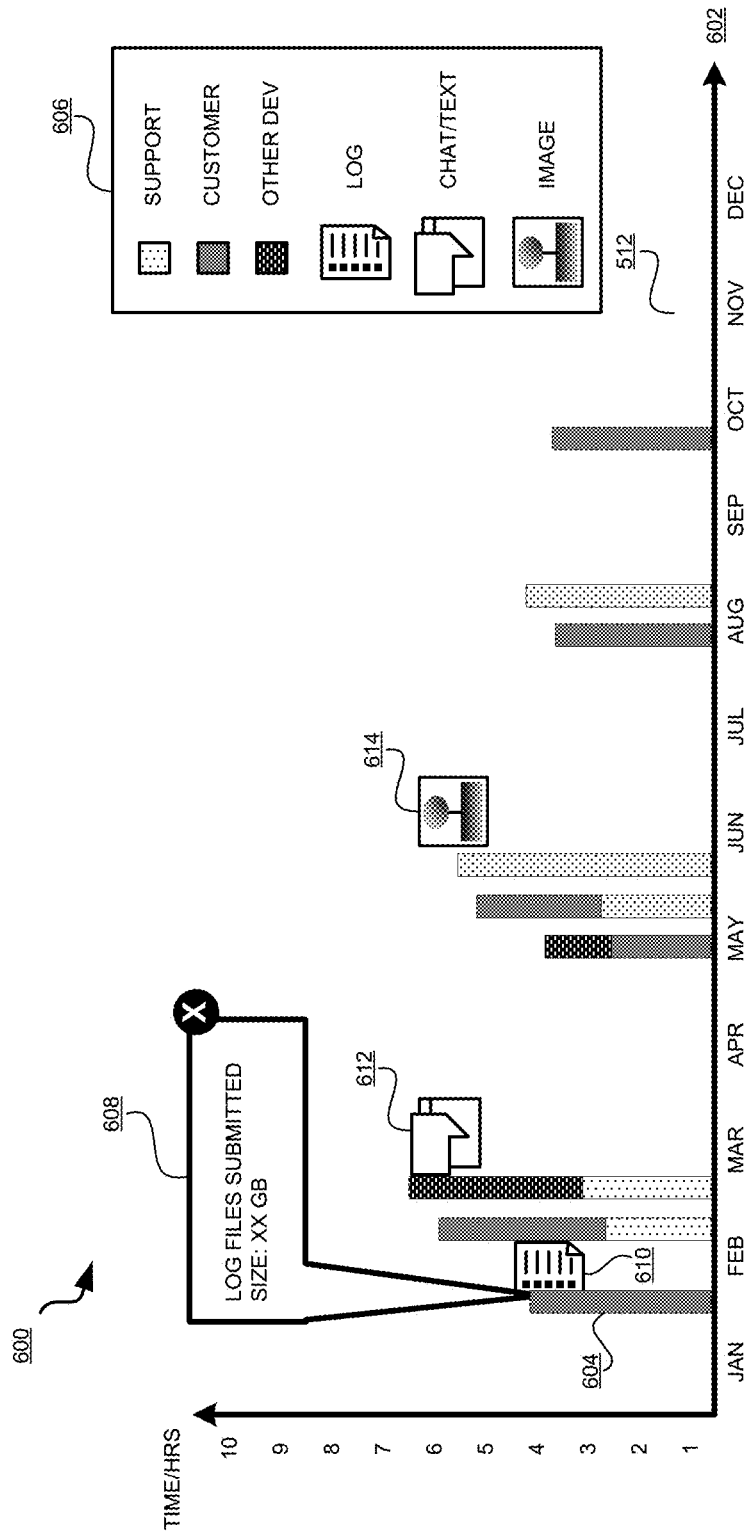
FIG. 6 depicts another example visualization of complex data in accordance with an illustrative embodiment.

With reference to FIG. 6, this figure depicts another example visualization of complex data in accordance with an illustrative embodiment. Visualization 600 can be generated, viewed, selected, selectively activated, and manipulated in a manner similar to visualization 500 in FIG. 5.

Visualization 600 depicts the result of another example analysis according to an embodiment. For example, over timeline 602, an embodiment implemented in application 105 of FIG. 1 presents the analysis of a lengthy problem record. Particularly, the application presents when certain events of interest occurred with respect to a problem, who was working on the problem at the time of the event, whether additional data is associated with the event, and a type of the associated data when available.

For example, bars in the bar-graph representation of visualization 600 correspond to certain events of interest. An embodiment configures legend 606 to contain information about the symbology and iconography used in visualization 600 in the manner of legend 406 in FIG. 4.

Bar 604 represents activities by a customer during the January-February period on timeline 602. Graphic 610 adjacent to bar 604 informs the viewer that data of type "log file" was submitted by the customer during the event of bar 604. In the manner of balloon 408 in FIG. 4, balloon or using another suitable visualization 608 shows the details of the submitted data, e.g., size of the submitted data. Many other pieces of information may be discernible from the complex data of the problem record or the submitted data itself. For example, balloon 608 can additionally show a location of storage of the submitted data, permissions associated with the data, the system information to which the logs pertain, age of the logs, and even other data located elsewhere that may be referenced in the logs.

Different graphics 612 and 614 indicate other types of information associated with other events along timeline 602 in a similar manner. An embodiment displays additional details of those other associated information, data, or documents, in a manner analogous to balloon 608. Of course, any other pertinent information available from the complex data, associated data, or data referenced from the complex data or associated data can similarly be presented in visualization 600.

Figure 7:
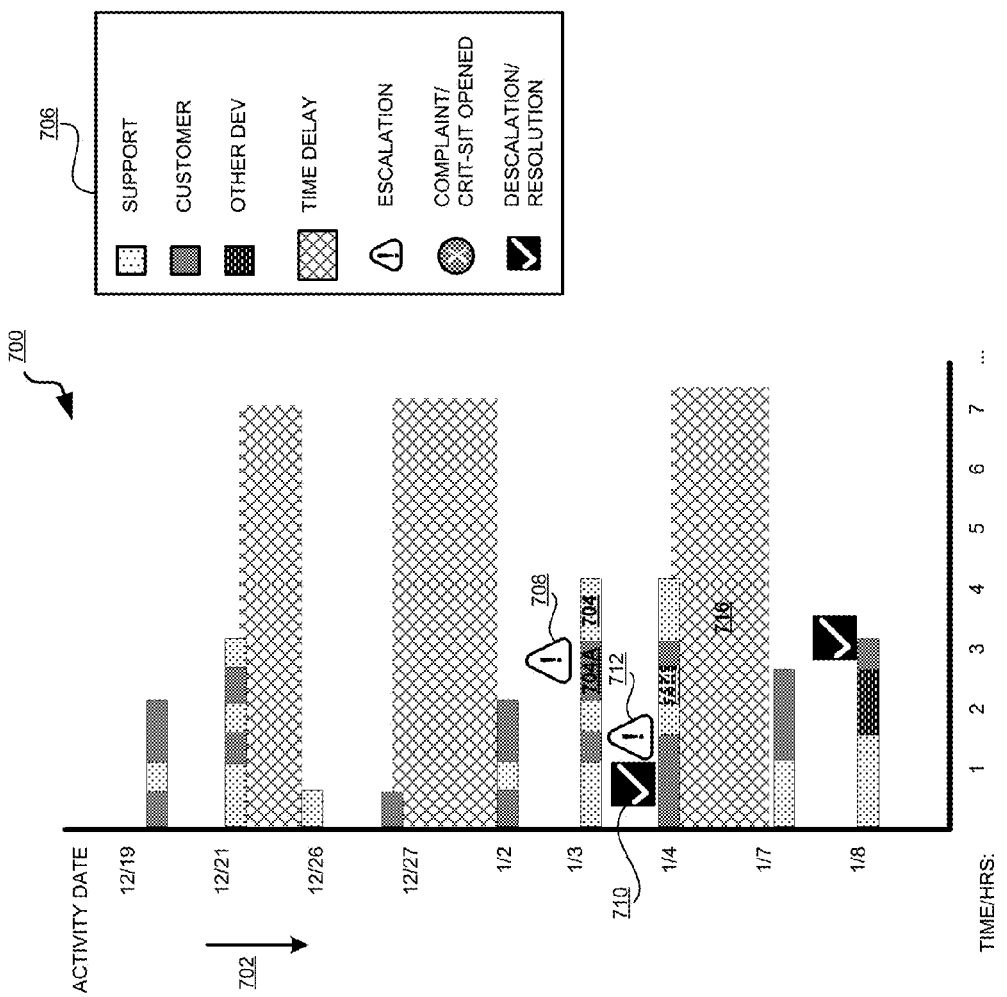
FIG. 7 depicts another example visualization of complex data in accordance with an illustrative embodiment.

With reference to FIG. 7, this figure depicts another example visualization of complex data in accordance with an illustrative embodiment. Visualization 700 can be generated, viewed, selected, selectively activated, and manipulated in a manner similar to visualization 600 in FIG. 6.

Visualization 700 depicts a different visual representation of the result of another example analysis according to an embodiment. For example, over timeline 702, an embodiment implemented in application 105 of FIG. 1 presents the analysis of a lengthy problem record. Particularly, the application presents when delays occurred in resolving a problem, who was working on the problem at the time of certain significant events, what actions were taken to solve the problem upon the occurrence of significant events, and whose contributions likely resulted in creating or resolving the significant event.

For example, bars in the bar-graph representation of visualization 700 correspond to a certain event of interest. An embodiment configures legend 706 to contain information about the symbology and iconography used in visualization 600 in the manner of legend 406 in FIG. 4.

Bar 704 represents mixed activities by several teams on January 3rd on timeline 702. The customer was working on or experiencing the problem at 704A in bar 704, when [the customer] escalated the problem, perhaps due to unsuccessful efforts since December 19th on timeline 702. Graphic 708 adjacent to bar portion 704A informs the viewer that the significant event of problem escalation occurred when support team was interacting with customer about the problem on January 3.

The support team continued to work on the problem on January 3, resulting in significant event 710 of descalation by customer on the following day. The descalation event 710 was probably premature because another significant event 712 of escalation was created by the customer during the same session on January 4.

A new team—the development team was included to resolve the problem following the significant event 712 who contributed resources at 714. Delay 716 was probably due to development activity to create a problem-fix, whereupon, the support team, the customer and the development team re-engaged, significant event 718 of descalation occurred, perhaps to a final resolution of the problem.

Of course, many other pieces of pertinent information may be available from the complex data, associated data, or referenced data, and can similarly be presented in visualization 700. As is evident from this example operation of certain embodiments, this type of analysis and conclusions are extremely difficult to reach by human-analysis of complex data. The embodiments that analyze the data and visualize the results of the analysis in this example manner significantly increase the value, comprehensibility, and effectiveness of the underlying complex data.

Figure 8:
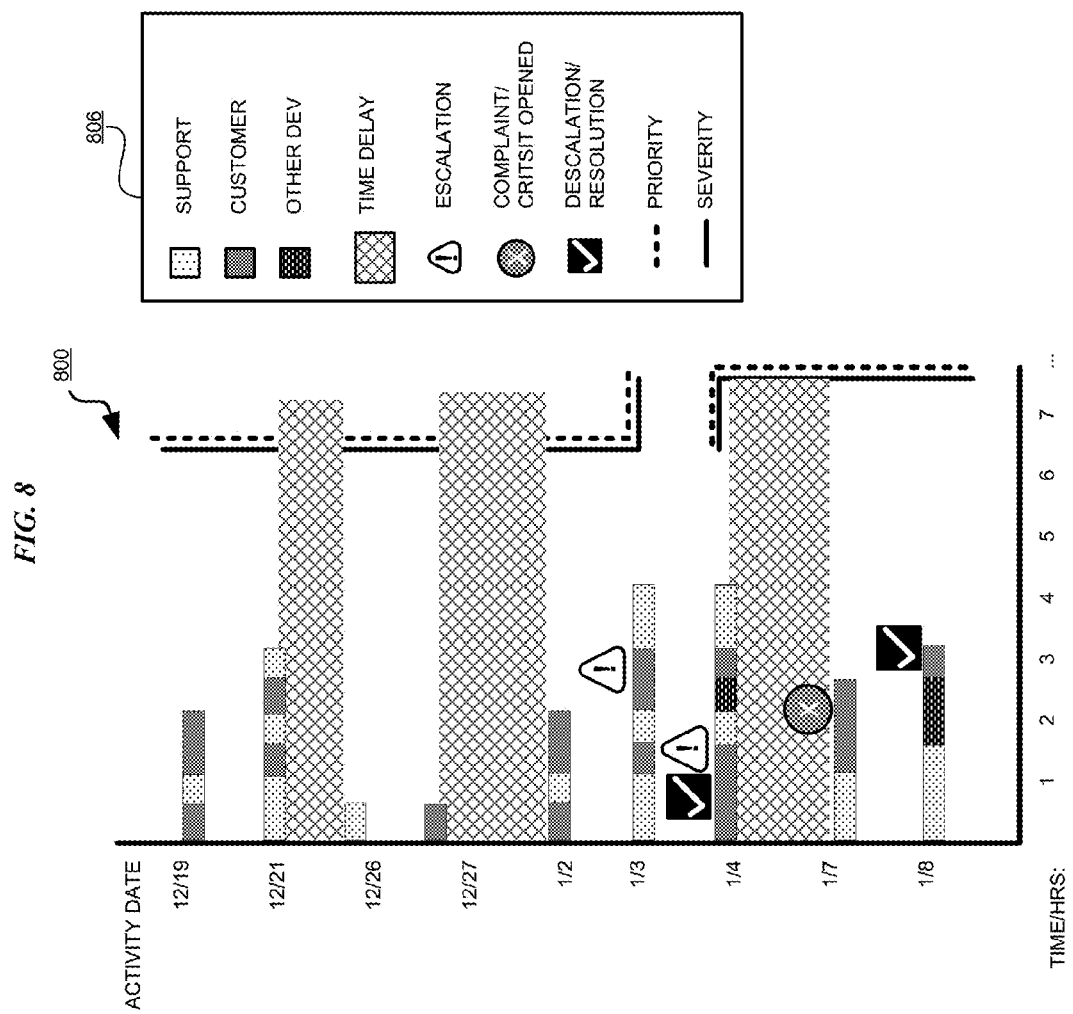
FIG. 8 depicts another example visualization of complex data in accordance with an illustrative embodiment.

With reference to FIG. 8, this figure depicts another example visualization of complex data in accordance with an illustrative embodiment. Visualization 800 can be generated, viewed, selected, selectively activated, and manipulated in a manner similar to visualization 700 in FIG. 7.

Visualization 800 combines certain example visualizations described earlier. Visualization 800 shows that the various embodiments implemented in application 105 permit the viewer to selectively display the visual aspects that are of interest to the viewer. As the viewer selects, turns on or off, brings forth or fades, or otherwise chooses to display the visual aspects in visualization 800, legend 806 adjusts correspondingly. Depending on the selected visual aspects, such as the timeline, the trend lines, the bars, the icons, the graphics, etc., an embodiment presents the analytical results corresponding to those visual aspects on visualization 800.

Figure 9:
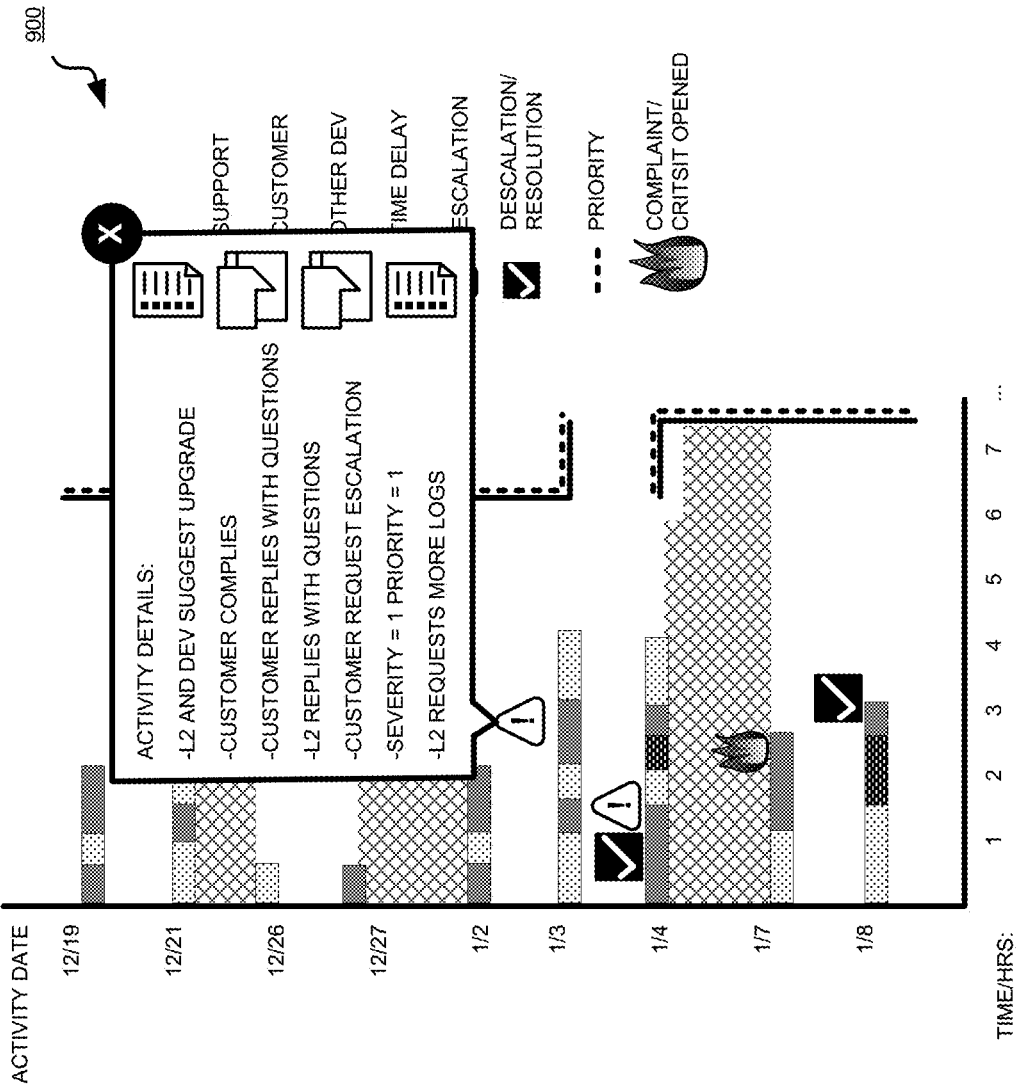
FIG. 9 depicts another example visualization of complex data in accordance with an illustrative embodiment.

With reference to FIG. 9, this figure depicts another example visualization of complex data in accordance with an illustrative embodiment. Visualization 900 can be generated, viewed, selected, selectively activated, and manipulated in a manner similar to visualization 800 in FIG. 8. Visualization 900 combines certain other example visualizations described earlier.

In one embodiment, the analyses corresponding to the several visual aspects are pre-performed prior to presenting visualization 900 to the viewer. In another embodiment, the analysis corresponding to a particular visual aspect is performed on-demand on the complex data when the viewer selects that visual aspect for presenting on visualization 900. In another embodiment, some analyses corresponding to some aspects of visualization 900 are pre-performed, and some other analyses corresponding to some aspects of visualization 900 are performed on demand.

Figure 10:
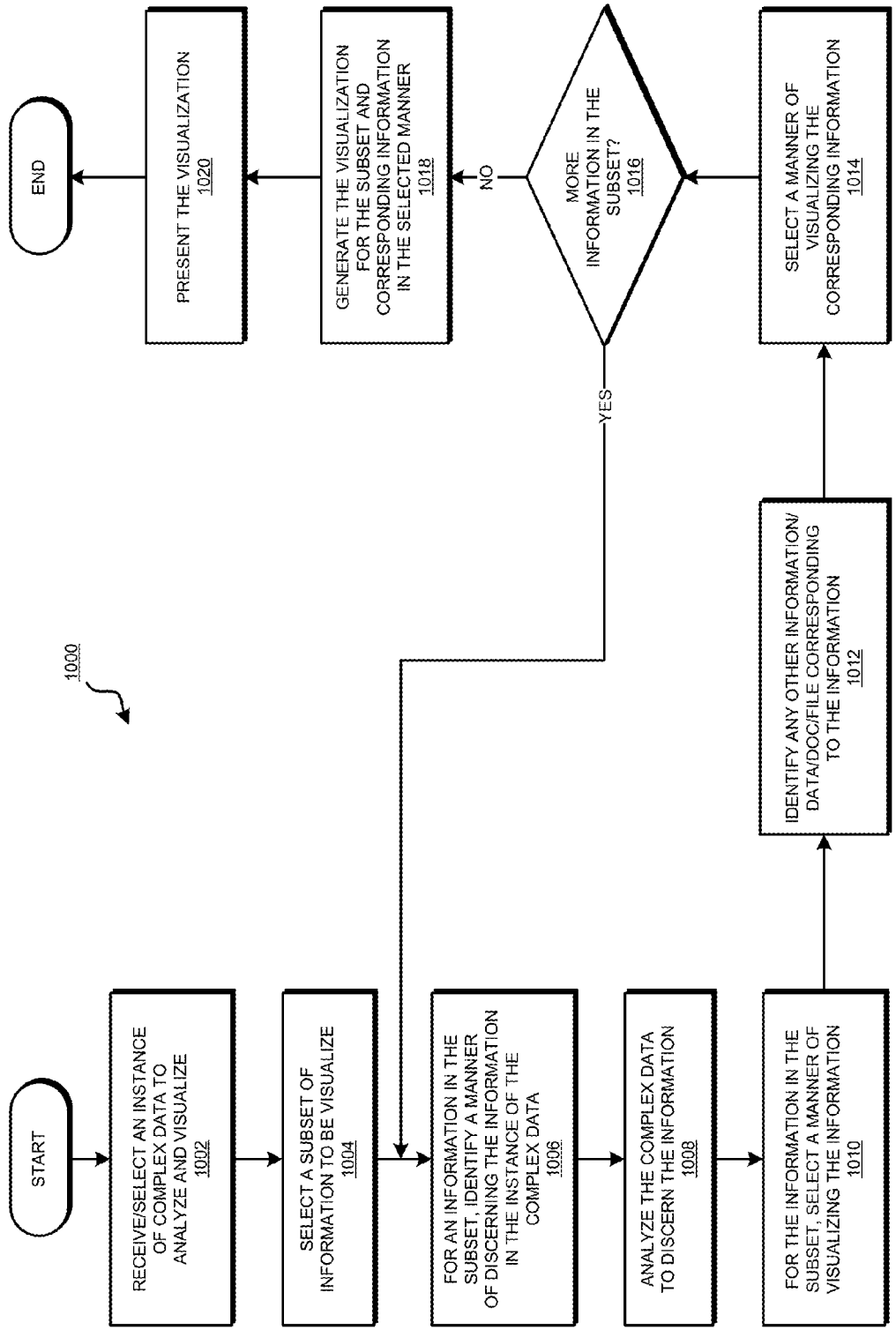
FIG. 10 depicts a flowchart of an example process for automated analysis and visualization of complex data in accordance with an illustrative embodiment.

With reference to FIG. 10, this figure depicts a flowchart of an example process for automated analysis and visualization of complex data in accordance with an illustrative embodiment. Process 1000 can be implemented in application 105 in FIG. 1.

The application receives or selects an instance of complex data, for example, a problem record or another document, to analyze and visualize (block 1002). The application selects a subset of information to be visualized (block 1004). For example, as described with respect to FIGS. 8 and 9, the viewer can instruct the application to present certain visual aspects. The information that underlies that selected visual aspect is a result of an analysis of the complex data. This underlying information is a member of the subset selected in block 1004.

For information in the subset, the application identifies a manner of discerning the information in the instance of the complex data (block 1006). The manner of discerning can employ any of the example methods of analyzing the complex data described herein, or other similarly purposed methods that will be conceivable from this disclosure for those of ordinary skill in the art. Such other methods are contemplated for use with an embodiment within the scope of the illustrative embodiments.

The application analyzes the instance of the complex data in the identified manner to discern the information in the subset (block 1008). For the discerned information, the application selects a manner of visualizing the information (block 1010). For example, the viewer can specify how the information should be visualized, e.g., as bars in a bar graph or histogram, lines, bubbles in a bubble graph, sections in a pie-chart, or any other suitable form of visual representation of data, and the application selects in block 1010 accordingly.

Alternatively, an embodiment allows configuring certain default manners of visualizing certain types of information in the application, and the application selects from the defaults when the viewer does not specify any particular manner of visualization. Another embodiment allows a combination of viewer-specification, defaults, memorized viewer preferences, and other ways of selecting the manners of visualization in block 1010.

The application identifies other information, documents, data, or files associated with or corresponding to the discerned information (block 1012). The application selects a manner of visualizing such corresponding information when available (block 1014). For example and without implying a limitation thereto, the description of FIG. 6 describes some examples of such corresponding information and example manners of visualizing them.

The application determines whether more information remains in the subset selected at block 1004 for analysis and visualization (block 1016). If more information remains ("Yes" path of block 1016), the application returns to block 1006. If not ("No" path of block 1016), the application generates the visualization for the subset of information and any corresponding information in their respectively selected manners (block 1018).

The application presents the visualization, such as to viewing application 111 in FIG. 1 (block 1020). The application ends thereafter or returns to block 1004 (not shown), such as when the viewer decides to further manipulate the visualization.

Thus, a system, and computer program product are provided in the illustrative embodiments for automated analysis and visualization of complex data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising a computer readable storage device including computer usable code for automated analysis and visualization of log data, the computer usable code comprising:

computer usable code for selecting, from a set of information, a subset of information to be visualized, wherein each information in the set comprises a result of a corresponding analysis technique applied to the log data;

computer usable code for analyzing, for an information in the subset of information, a tagged portion of the log data according to the corresponding analysis technique to discern the information, wherein the information corresponds to a tag used in conjunction with the tagged portion;

computer usable code for selecting, for the information, a manner of visualizing the information;

computer usable code for generating a set of graphical visualizations comprising a corresponding graphical visualization for each information in the subset of information, including a visualization in the selected manner of visualizing the information; and computer usable code for combining the graphical visualizations in the set such that a subset of graphical visualization is selectable for presentation, wherein the set of graphical visualizations is generated from a log of an effort to solve a problem reported in the log data, and wherein a first graphical visualization in the set of graphical visualizations represents a discrete event in the effort.

2. The computer usable program product of claim 1, wherein the analysis technique comprises a manner of interpreting the tagged portion of the log data.

3. The computer usable program product of claim 2, wherein the manner of interpreting the tagged portion of the log data comprises:

determining that a set of entries in the log data are related to an event, wherein the event relates to the information; and summarizing the set of entries to discern the information.

4. The computer usable program product of claim 2, wherein the manner of interpreting the log data comprises:

determining that an entry in the log data is related to the information;

determining that the entry includes an indication of other log data that should be analyzed with the entry; analyzing the other log data;

including a portion of the entry in the information; and including a result of the analysis of the other log data in the information.

5. The computer usable program product of claim 1, further comprising:

computer usable code for selecting from a configuration, the manner of visualizing the information, wherein the manner of visualizing the information is saved as a visualization preference of a user.

6. The computer usable program product of claim 1, wherein the log data comprises a record of a problem reported in a trouble ticket, wherein the record comprises a set of entries and omits the information, and wherein the information is computed from a subset of the set of entries.

7. The computer usable program product of claim 1, wherein a first graphical visualization in the set of graphical visualizations represents a first duration of time a particular group was responsible for solving a problem reported in the log data, and wherein the first graphical visualization causes a gap in responsiveness of the particular group to become graphically observable, wherein no graphical visualization in the set of graphical visualization is specifically generated for the gap in the responsiveness.

8. The computer usable program product of claim 1, graphical visualizations collectively represents a record of an effort to solve a problem reported represents a discrete event in the effort, and wherein a selecting action causes a second graphical visualization to become observable relative to the first graphical visualization and provide supplemental information about the discrete event.

9. The computer usable program product of claim 1, wherein the computer usable code is stored in a computer readable storage medium in a data processing system, and wherein the computer usable code is transferred over a network from a remote data processing system.

10. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

11. A data processing system for automated analysis and visualization of log data, the data processing system comprising:

a storage device including a storage medium, wherein the storage device stores computer usable program code; and a processor, wherein the processor executes the computer usable program code, and wherein the computer usable program code comprises:

computer usable code for selecting, from a set of information, a subset of information to be visualized, wherein each information in the set comprises a result of a corresponding analysis technique applied to the log data;

computer usable code for analyzing, for an information in the subset of information, a tagged portion of the log data according to the corresponding analysis technique to discern the information, wherein the information corresponds to a tag used in conjunction with the tagged portion;

computer usable code for selecting, for the information, a manner of visualizing the information;

computer usable code for generating a set of graphical visualizations comprising a corresponding graphical visualization for each information in the subset of information, including a visualization in the selected manner of visualizing the information; and computer usable code for combining the graphical visualizations in the set such that a subset of graphical visualization is selectable for presentation, wherein the set of graphical visualizations is generated from a log of an effort to solve a problem reported in the log data, and wherein a first graphical visualization in the set of graphical visualizations represents a discrete event in the effort.

* * * * *